United States Patent Office 2,898,346
Patented Aug. 4, 1959

2,898,346

1,1,4,4-TETRAMETHYL-1,4-DISILA-3,6-DIOXACYCLOHEXANE

Benjamin A. Eynon, Midland, Mich., assignor to Dow Corning Corporation, Midland, Mich., a corporation of Michigan No Drawing. Application February 11, 1957
Serial No. 639,180

1 Claim. (Cl. 260—338)

This invention relates to new compositions useful in the preparation of resins.

More specifically this invention relates to compositions of the unit formula $$[-\underset{\underset{\text{Me}_2}{|}}{\text{Si}}\text{CH}_2\text{O}-]$$

These compositions may be linear or cyclic.

The compositions of this invention are preferably prepared from methylol siloxanols such as

[HOCH$_2$Si]$_2$O
    |
   Me$_2$

The latter is prepared as shown in U.S. Patent 2,527,591, issued October 31, 1950. The methylol siloxanol is heated in the presence of a drying agent such as CaO. The reaction can be accomplished under a vacuum which will reduce the temperature of reaction. The water by-product can be removed by heat alone or by azeotroping the reaction mixture with benzene in the presence of KOH. The linear compositions may be endblocked with hydroxy radicals, alkoxy radicals, or any other radicals present in the reaction mixture.

The compositions of this invention are especially useful as reactive intermediates in the preparation of silicone-alkyd resins and silicon-urethane resins.

The following example is illustrative of the method of preparation and is not intended to limit this invention which is properly set out in the claim.

Example 1

150 grams of

[HOCH$_2$Si]$_2$O
    |
   Me$_2$ were heated with 45 grams of dry CaO at a pot temperature of approximately 250° C. under a vacuum having an absolute pressure of 100 mm. Hg and the volatiles were removed. At a vapor temperature of 86° C. a 70 gram fraction was distilled off having the following physical properties:

$n_D^{25}$ 1.4245, $R_D$ (experimental) 0.2751
$d_4^{25}$ 0.9285, $R_D$ (calculated) 0.2753

This product had the formula

Me$_2$Si——CH$_2$
 |        |
 O        O
 |        |
 CH$_2$—SiMe$_2$

Distillation was stopped leaving 109 grams of higher-boiling residue. This residue had a refractive index $n_D^{25}$=1.4188 and was a linear homopolymer of the unit formula $$[-\underset{\underset{\text{Me}_2}{|}}{\text{Si}}\text{CH}_2\text{O}-]$$

That which is claimed is:
A composition of the formula

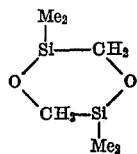

References Cited in the file of this patent

UNITED STATES PATENTS 2,582,799     Sauer ------------------ Jan. 15, 1952

OTHER REFERENCES

Sommer et al.: Jr. Am. Chem. Soc., vol. 77 (1955), pp. 2482–5.